US006284699B1

(12) United States Patent
Ohgane et al.

(10) Patent No.: US 6,284,699 B1
(45) Date of Patent: Sep. 4, 2001

(54) MODIFIED PARTICLES, CATALYST FOR OLEFIN POLYMERIZATION CONTAINING THE SAME, AND METHOD FOR PRODUCING OLEFIN POLYMER

(75) Inventors: Takuya Ohgane, Sodegaura; Hideki Sato, Niihama; Hiroaki Katayama, Narashino, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/274,774

(22) Filed: Mar. 24, 1999

(30) Foreign Application Priority Data

Mar. 25, 1998 (JP) ................................................ 10-077654

(51) Int. Cl.$^7$ ............................ B01J 21/06; B01J 23/20; B01J 23/24; B01J 23/40; B01J 23/74
(52) U.S. Cl. ...................... 502/103; 502/150; 502/172; 502/231; 502/263; 502/351; 502/104; 526/943
(58) Field of Search .................................. 502/103, 104, 502/172, 231, 263, 351, 150; 526/943

(56) References Cited

U.S. PATENT DOCUMENTS

| | | | |
|---|---|---|---|
| 4,808,561 | 2/1989 | Welborn, Jr. et al. | 502/104 |
| 4,912,075 | 3/1990 | Chang | 502/107 |
| 4,935,474 | 6/1990 | Ewen et al. | 526/114 |
| 4,937,299 | 6/1990 | Ewen | 526/119 |
| 4,980,329 | * 12/1990 | Barbe et al. | 502/111 |
| 5,234,878 | 8/1993 | Tsutsui et al. | 502/103 |
| 5,324,800 | 6/1994 | Welborn, Jr. et al. | 526/160 |
| 5,700,749 | 12/1997 | Tsutsui et al. | 502/117 |

FOREIGN PATENT DOCUMENTS

| | | |
|---|---|---|
| 0658576A1 | 12/1994 | (EP) . |
| 6035006A | 2/1985 | (JP) . |
| 6035008A | 2/1985 | (JP) . |
| 61108610A | 5/1986 | (JP) . |
| 61276805A | 12/1986 | (JP) . |
| 61296008A | 12/1986 | (JP) . |
| 6351407A | 3/1988 | (JP) . |
| 6389505A | 4/1988 | (JP) . |
| 1207303A | 8/1989 | (JP) . |
| 3234710A | 10/1991 | (JP) . |
| 06329713A | 5/1993 | (JP) . |
| 6329713A | 11/1994 | (JP) . |
| 6336502A | 12/1994 | (JP) . |
| 8198909A | 8/1996 | (JP) . |
| 9143217A | 6/1997 | (JP) . |
| 9249707A | 9/1997 | (JP) . |
| WO/9109882A1 | 7/1991 | (WO) . |

* cited by examiner

Primary Examiner—Mark L. Bell
Assistant Examiner—Michael J. DiVerdi
(74) Attorney, Agent, or Firm—Birch, Stewart, Kolasch & Birch, LLP

(57) ABSTRACT

Modified particles obtained by a process comprising contacting water-containing particles(a), an organometallic compound(b) and a compound(c) having a functional group containing active hydrogen or a non-proton donative Lewis basic functional group, and having an electron attractive group; a carrier of said particles; a catalyst component for olefin polymerization of said particles; a catalyst for olefin polymerization comprising said particles(A) and a transition metal compound(B), and optionally, an organometallic compound (C); and a method for producing an olefin polymer with said catalyst for olefin polymerization.

24 Claims, 1 Drawing Sheet

MODIFIED PARTICLES, CATALYST FOR OLEFIN POLYMERIZATION CONTAINING THE SAME, AND METHOD FOR PRODUCING OLEFIN POLYMER

BACKGROUND OF THE INVENTION

1. Field of the Invention

The present invention relates to particles which are useful as a carrier and a catalyst component for olefin polymerization, a catalyst for olefin polymerization using the same, and method of producing an olefin polymer with said catalyst for olefin polymerization.

2. Description of the Related Arts

Many methods of producing an olefin polymer using a transition metal compound have already been reported. As the example of using a metallocene transition metal compound, for example, Japanese Patent Publication(Kokai) No.58-19309 discloses a method for producing an olefin polymer using bis(cyclopentadienyl)zirconium dichloride and methylaluminoxane as a catalyst.

Since the catalyst using these transition metal compounds is soluble in a reaction system, when used in a polymerization accompanying formation of polymer particles (e.g. slurry polymerization, gas phase polymerization), the shape of the formed polymer particles is irregular, which can cause the formation of a large particle polymer, an agglomerate polymer, a fine powdered polymer and the like, a decrease in the bulk density of the polymer, and adhesion of the polymer to the wall of the polymerization reactor. consequently, these occurrences can cause poor heat transfer and poor cooling in the reactor, which results in difficulty in stable operation and a lowering of productivity.

In order to apply the transition metal compound to the polymerization accompanying formation of polymer particles, it is required that not only that a sufficient polymerization activity is exhibited but also that a polymer excellent in shape and particle properties is obtained. To solve these problems, a method of supporting a transition metal compound on a carrier or the like has been proposed.

For example, a method of fixing or supporting all or a part of catalyst components such as a metallocene complex, methylaluminoxane or the like on an inorganic metal oxide carrier such as silica or the like has been proposed.

For example, in U.S. Pat. Nos. 4,937,299, 5,324,800 or 4,935,474, it is disclosed that a soluble metallocene compound is deposited or adhered on a typical support(e.g. silica, alumina, polyethylene) to convert into a supported heterogeneous catalyst component, and the catalyst component is used as a combination with an aluminoxane in the slurry polymerization or gas phase polymerization.

In Japanese Patent Publication (Kokai) No.61-108610, it is disclosed that an olefin polymer is produced by using a solid catalyst component obtained by adding a calcined silica to a mixture of bis(cyclopentadienyl)zirconium dichloride and a reaction product of trimethylaluminum with water.

In Japanese Patent Publication (Kokai) No.61-276805, it is disclosed that an olefin polymer is produced by using an inorganic oxide-containing organoaluminum component, obtained by reacting a mixture of methylaluminoxane and trimethylaluminum with silica, and bis(cyclopentadienyl) zirconium dichloride.

In U.S. Pat. No. 4,808,561, it is disclosed that an olefin polymer is produced by using a solid catalyst containing aluminum and zirconium, obtained by treating silica in turn with methylaluminoxane and bis(cyclopentadienyl) zirconium chloride.

As improved methods, for example, there has been reported a method of using a solid catalyst component, obtained by fixing or supporting all or a part of a catalyst component such as a metallocene complex, methylaluminoxane, etc. on an inorganic metal oxide carrier such as silica, etc., and aluminoxane or organoaluminum, and a method of using a prepolymerized catalyst obtained by conducting prepolymerization.

Japanese Patent Publication (Kokai) No.63-51407 discloses a method of producing an olefin polymer using a solid catalyst component obtained by treating silica in turn with methylaluminoxane and bis(cyclopentadienyl)zirconium dichloride, and methylaluminoxane.

U.S. Pat. No. 5,700,749 discloses a method of producing an olefin polymer using a solid catalyst component, obtained by treating silica in turn with methylaluminoxane and bis (cyclopentadienyl)zirconium dichloride, and triisobutylaluminum or a method of producing an olefin polymer using a solid catalyst component prepolymerized with the solid catalyst component and triisobutylaluminum.

In the above prior arts, use of aluminoxane is essential. This aluminoxane must be separately synthesized, and the synthesis method is complicated because it requires a lot of steps. The aluminoxane is unstable and costly. Regarding the solid catalyst component obtained by combining the aluminoxane with an inorganic metal oxide carrier such as silica, the amount of aluminum used is large and the activity per 1 mol of an Al atom was low.

To solve these problems, there has been reported a method of producing an olefin polymer using a solid catalyst component obtained by reacting an organoaluminum with water in the presence of an inorganic metal oxide carrier such as silica to form aluminoxane.

For example, Japanese Patent Publication (Kokai) No. 61-31404 discloses a method of producing an olefin polymer using a catalyst obtained by adding water, trimethylaluminum and bis(cyclopentadienyl)zirconium dichloride in turn to silica.

U.S. Pat. No. 4,912,075 discloses a method of producing an olefin polymer using silica gel powders containing a supported metallocene-methylaluminoxane catalyst complex, obtained by adding silica gel not dehydrated, containing water to trimethylaluminum and then treating the resultant with bis(n-butylcyclopentadienyl)zirconium dichloride.

U.S. Pat. No. 5,234,878 discloses a method of producing an olefin polymer using a prepolymerized solid catalyst obtained by adding water, trimethylaluminum and bis (methylcyclopentadienyl)zirconium dichloride in turn to silica and further adding ethylene to the mixture, and triisobutylaluminum.

Further, there was recently reported an example using a clay mineral as a water containing-carrier. In Japanese Patent Publication (Kokai) No.5-295022, there is disclosed a method comprising treating bis(cyclopentadienyl) zirconium dichloride and montmorillinite as a clay mineral with trimethylaluminum, further adding ethylene to obtain a prepolymerized solid catalyst, and producing a olefin polymer using the solid catalyst.

These prior art references describe that synthesis of an aluminoxane, and at the same time, fixing of the aluminoxane to an inorganic metal oxide carrier such as silica can be easily performed by a simple method. However, solid catalyst components obtained by this method have a low activity unlike a solid catalyst component obtained by fixing the separately synthesized aluminoxane, and the particle properties of the resulting polymer are not preferred.

Recently, there has been reported a method of preparing an olefin polymerization catalyst using an aluminum compound wherein a special group is introduced, in place of an aluminoxane, in combination with a transition metal compound, or in combination with an additional organoaluminum compound, and a method producing an olefin polymer with said catalyst.

For example, Japanese Patent Publication (Kokai) No.6-329713 discloses a method of producing an olefin polymer using a solid component of an aluminum compound having an electron attractive group, obtained by reacting trimethylaluminum and pentafluorophenol, and bis(cyclopentadienyl)titanium dichloride. There is also described a method of producing a catalyst component by supporting an aluminum compound, wherein a special group is introduced, on an inorganic carrier or an organic carrier. However, there is not disclosed an example of actually supporting an aluminum compound having an electron attractive group obtained by reacting trimethylaluminum with pentafluorophenol, and the polymerization activity in case of using a supported solid catalyst component as described in the above-prior art reference was low.

SUMMARY OF THE INVENTION

Under these circumstances, an object of the present invention is to provide particles capable of giving a polymer having high activity and excellent shape and particle properties when a catalyst for olefin polymerization obtained by using a transition metal compound is applied to the polymerization accompanying formation of polymer particles (e.g. slurry polymerization, gas phase polymerization, etc.) by using in combination with the transition metal compound, a carrier of said particles, a catalyst for olefin polymerization of said particles, a catalyst for olefin polymerization using said particles, and a method of producing an olefin polymer using said catalyst for olefin polymerization.

The present inventors have intensively investigated about a method of producing an olefin polymer using a transition metal compound, particularly a method of producing an olefin polymer according to the polymerization accompanying formation of polymer particles. As a result, the present inventors have found modified particles obtained by bringing dried particles into contact with a specific compound, thus accomplishing the present invention.

Accordingly, the present invention provides modified particles obtained by a process comprising contacting (a) water-containing particles, (b) an organometallic compound and (c) a compound having a functional group containing active hydrogen or an non-proton donative Lewis basic functional group, and having an electron attractive group.

The present invention also provides a carrier consisting essentially of said particles; a catalyst component for olefin polymerization, consisting essentially of said particles; a catalyst for olefin polymerization, comprising said particles (A) and a transition metal compound (B), and optionally, an organometallic compound (C); and a method for producing an olefin polymer with said catalyst for olefin polymerization.

DETAILED DESCRIPTION OF THE INVENTION

Figure 1:
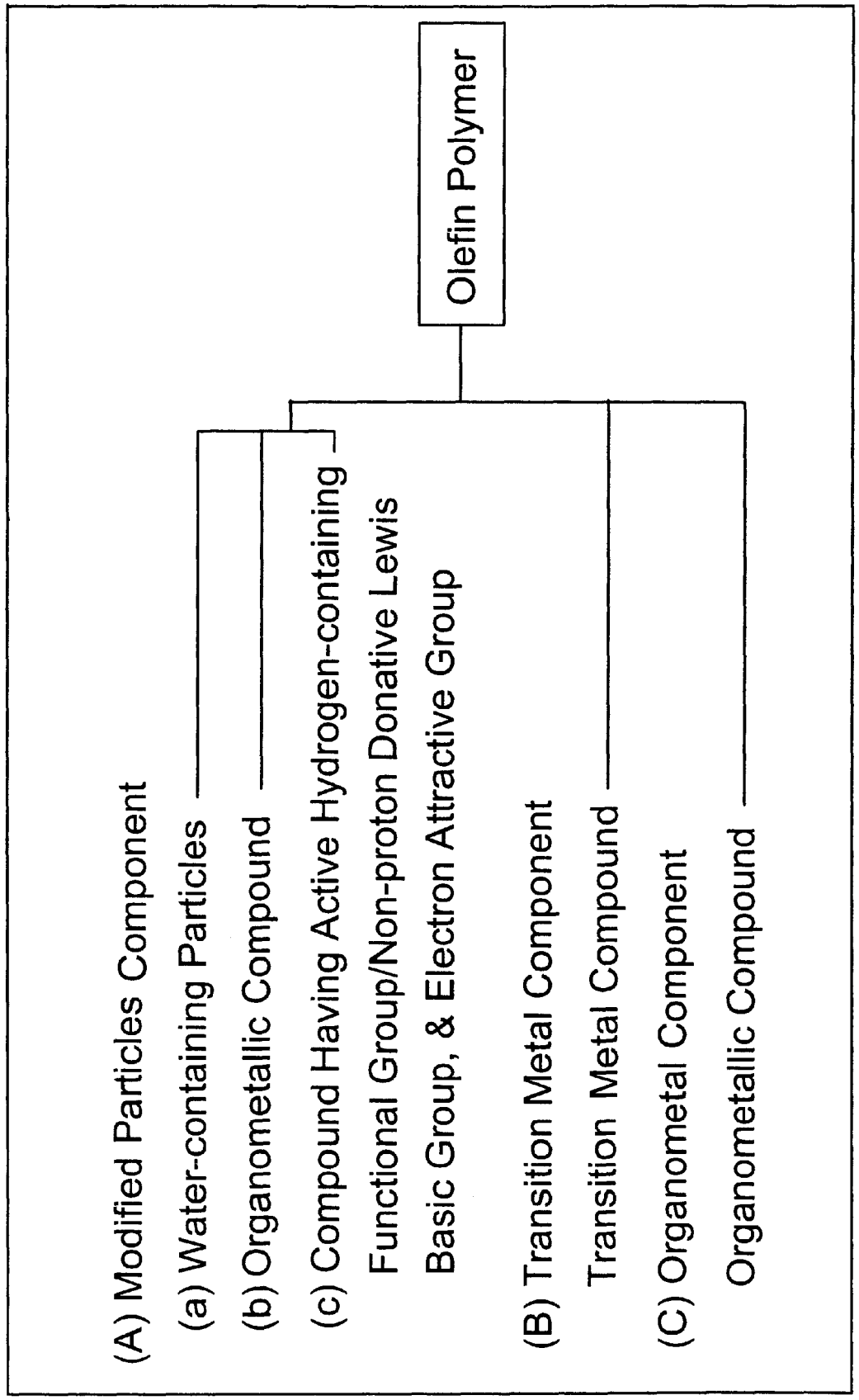
FIG. 1 shows a flow chart for assisting in an understanding of the present invention. This flow chart is a typical example of an embodiment of the present invention, and the present invention is not limited thereto or thereby.

The present invention is described in detail below, as an aid to those desiring to practice the present invention.

(a) Water-containing Particles

The modified particles of the present invention are obtained by contacting (a) water-containing particles, (b) an organometallic compound and (c) a compound having a functional group containing an active hydrogen or a non-proton donative Lewis basic functional group, and having an electron attractive group. The water-containing particles (a) used herein contain water, and particularly, are those in which an absorbed water has not been perfectly eliminated. Also, the water-containing particles (a) maybe those in which a predetermined amount of water has been added, or which are dried so that an absorbed water is incompletely eliminated therefrom. The water content of the particles preferably contain not less than 6% by weight, more preferably 6 to 13% by weight, most preferably 8 to 11% by weight.

The value of the water content conveniently may be substitute with a TV(Total Volatile) value as described in various catalogues with respect to commercial products.

The detailed mechanism is unknown, but it is assumed that the water contained in the particles reacts with the organoaluminum compound(b).

As the particles(a), there are preferably mentioned and used those which are generally a carrier. A porous substance having a uniform particle diameter is preferred and an inorganic substance or an organic polymer substance is preferably used.

Examples of the inorganic substance which can be used in the particles(a) include inorganic oxides and magnesium compounds, clays and clay minerals. These substances may be used in combination.

Specific examples of the inorganic oxide include $SiO_2$, $Al_2O_3$, MgO, $ZrO_2$, $TiO_2$, $B_2O_3$, CaO, ZnO, BaO, $ThO_2$ and mixtures thereof such as $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO, etc. Among these inorganic oxides, $SiO_2$ and/or $Al_2O_3$ are preferred. The above inorganic oxide may contain a small amount of carbonate, sulfate, nitrate or oxide, such as $Na_2O_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, $Li_2O$, etc.

Examples of the magnesium compound include halogenated magnesiums such as magnesium chloride, magnesium bromide, magnesium iodide, magnesium fluoride and the like; alkoxymagnesium halides such as methoxymagnesium chloride, ethoxymagnesium chloride, isopropoxymagnesium chloride, butoxymagnesium chloride, octoxymagnesium chloride and the like; aryloxymagnesium halides such as phenoxymagnesium chloride, methylphenoxymagnesium chloride and the like; alkoxymagnesium such as diethoxymagnesium, diisopropoxymagnesium, di-n-butoxymagnesium, di-isobutoxymagnesium, di-n-octoxy) magnesium, di(2-ethylhexoxy)magnesium and the like; diaryloxymagnesium such as diphenoxymagnesium, dimethylphenoxymagnesium and the like; carboxylate of magnesium, such as magnesium laurate, magnesium stearate and the like.

Among them, the halogenated magnesium or alkoxymagnesium compounds are preferred, with magnesium chloride or dibutoxymagnesium being most preferred.

Examples of clay or clay minerals include kaolin, bentonite, Kibushi clay, gaerome clay, allophane, hisingerite, pyrophylite, talc, mica groups, montmorillinite groups, vermiculite, chlorite groups, palygorskite, kaolinite, nacrite, dickite, halloycite and the like.

Among them, smectite, montmorillinite, hectorite, raponite and saponite are preferred, and montmorillinite and hectorite are more preferred.

An average particle diameter of the inorganic substance is preferably from 5 to 1000 $\mu$m, more preferably from 10 to 500 $\mu$m, and most preferably from 10 to 100 $\mu$m. The pore volume thereof is preferably not less than 0.1 ml/g, and more preferably not less than 0.3 ml/g. The specific surface area thereof is preferably from 10 to 1000 m$^2$/g, and more preferably from 100 to 500 m$^2$/g.

As the organic polymer substance used in the particles(a) in the present invention, any organic polymer substance may be used and a mixture of plural kinds of organic polymer substances may also be used. As the organic polymer substance, an organic polymer substance having a functional group capable of reacting with the organometallic compound(b) is preferred. Examples of the functional group include functional groups containing active hydrogen, non-proton donative Lewis basic functional groups and the like.

The functional group containing active hydrogen may be any one containing active hydrogen, and is not particularly limited. Specific examples thereof include a primary amino group, secondary amino group, imino group, amide group, hydrazide group, amidino group, hydroxy group, hydroperoxy group, carboxyl group, formyl group, carbamoyl group, sulfonic acid group, sulfinic acid group, sulfenic acid group, thiol group, thioformyl group, pyrrolyl group, imidazolyl group, piperidyl group, indazolyl group, carbazolyl group and the like. Among them, the primary amino group, secondary amino group, imino group, amide group, hydroxy group, formyl group, carboxyl group, sulfonic group or thiol group is preferred. The primary amino group, secondary amino group, imino group, amide group or hydroxy group is particularly preferred. These groups may be substituted with a halogen atom or a hydrocarbon group having 1 to 20 carbon atoms.

The non proton-donative Lewis basic functional group may be any functional group having a Lewis basic portion containing no active hydrogen atom, and is not specifically limited. Specific examples thereof include a pyridyl group, N-substituted imidazolyl group, N-substituted indazolyl group, nitrile group, azido group, N-substituted imino group, N,N-substituted amino group, N,N-substituted aminoxy group, N,N,N-substituted hydrazino group, nitroso group, nitro group, nitroxy group, furyl group, carbonyl group, thiocarbonyl group, alkoxy group, alkyloxycarbonyl group, N,N-substituted carbamoyl grop, thioalkoxy group, substituted sulfinyl group, substituted sulfonyl group, substituted sulfonic acid group and the like. A heterocyclic group is preferred, and an aromatic heterocyclic group having an oxygen atom and/or a nitrogen atom in the ring is more preferred. Among them, a pyridyl group, N-substituted imidazolyl group and N-substituted indazoyl group are particularly preferred and a pyridyl group is most preferred. These groups may be substituted with a halogen atom or a hydrocarbon group having 1 to 20 carbon atoms.

The amount of the functional group containing active hydrogen or non-proton donative Lewis basic functional group is not specifically limited, but is preferably from 0.01 to 50 mmol/g, and more preferably from 0.1 to 20 mmol/g, in terms of a molar amount of the functional group per g of the organic polymer.

The organic polymer having such a functional group can be obtained, for example, by copolymerizing a monomer having a functional group containing active hydrogen or a non-proton donative Lewis basic functional group and one or more unsaturated bonds with another monomer having one or more unsaturated bonds. At this time, it is preferred to copolymerize the above monomers with a crosslinking polymerizable monomer having two or more unsaturated bonds.

Examples of the monomer having a functional group containing active hydrogen or non-proton donative Lewis basic functional group and one or more unsaturated bonds include the above monomer having a functional group containing active hydrogen and one or more unsaturated functional groups or a monomer having a functional group having a Lewis basic portion not containing active hydrogen and one or more unsaturated functional groups.

Examples of the unsaturated functional group include alkenyl groups such as a vinyl group, allyl group and the like; alkynyl groups such as an ethyne group and the like. Examples of the monomer having a functional group containing active hydrogen and one or more unsaturated bonds include a vinyl group-containing primary amine, a vinyl group-containing secondary amine, a vinyl group-containing amide compound, a vinyl group-containing hydroxy compound and the like. Specific examples thereof include N-(1-ethenyl)amine, N-(2-propenyl)amine, N-(1-ethenyl)-N-methylamine, N-(2-propenyl)-N-methylamine, 1-ethenylamide, 2-propenylamide, N-methyl-(1-ethenyl) amide, N-methyl-(2-propenyl)amide, 2-propen-1-ol, 3-buten-1-ol and the like.

Specific examples of the monomer having a functional group having a Lewis basic portion not containing active hydrogen and one or more unsaturated functional groups include vinylpyridine, vinyl(N-substituted)imidazole, vinyl (N-substituted)indazole and the like.

Examples of the other monomer having one or more unsaturated bonds include ethylene, $\alpha$-olefins and the like, and specific examples thereof include ethylene, propylene, butene-1, hexene-1, 4-methyl-pentene-1, styrene and the like. Among them, ethylene or styrene is preferred. Two or more kinds of these monomers may be used.

The crosslinking polymerizable monomer having two or more unsaturated bonds includes monomer having two or more unsaturated functional groups. Specific examples thereof include divinylbenzene and the like.

An average particle diameter of the organic polymer substance is preferably from 5 to 1000 $\mu$m, and more preferably from 10 to 500 $\mu$m. A pore volume is preferably not less than 0.1 ml/g, and more preferably not less than 0.3 ml/g. The specific surface area is preferably from 10 to 1000 m$^2$/g, and more preferably from 50 to 500 m$^2$/g.

(b) Organometallic Compound

The organometallic compound(b) used in the present invention is preferably an organoboron compound or an organoaluminum compound, and more preferably a compound represented by the following general formula (1):

$$R^1{}_n AX_{3-n} \tag{1}$$

(wherein A represents a boron atom or an aluminum atom; $R^1$ represents a hydrocarbon group having 1 to 20 carbon atoms and a plurality of $R^1$, when present, may be the same or different; X, when present, represents a halogen atom or a hydrogen atom and a plurality of X may be the same or different; and n represents a number satisfying the expression $0 < n \leq 3$).

When A is a boron atom, specific examples of the organometallic compound (b) include trialkylboranes such as trimethylborane, triethylborane, tripropylborane, tri-n-butylborane, triisobutylborane, triphenylborane and the like; dialkylhalideboranes such as dimethylchloroborane, diethylchloroborane, di-n-propylchloroborane, diisopropylchloroborane, di-n-butylchloroborane, diisobutylchloroborane, diphenylchloroborane and the like; dialkylhydrideboranes such as dimethylhydridoborane, diethylhydridoborane, di-n-propyldihydridoborane, diisopropyldihydridoborane, di-n-butylhydridoborane, diisobutylhydridoborane, diphenylhydridoborane and the like; alkyldihalideboranes such as methyldichloroborane, ethyldichloroborane, n-propyldichloroborane, isopropyldichloroborane, n-butyldichloroborane, isobutyldichloroborane, phenyldichloroborane and the like.

When A is an aluminum atom, specific examples of the organometallic compound (b) include trialkylaluminums such as trimethylaluminum, triethylaluminum, tripropylaluminum, tri-n-butylaluminum, triisobutylaluminum, tri-n-hexylaluminum and the like; dialkylaluminum halides such as dimethylaluminum chloride, diethylaluminum chloride, di-n-propylaluminum chloride, diisobutylaluminum chloride, di-n-butylaluminumchloride, diisobutylaluminum chloride, di-n-hexylaluminum chloride and the like; alkylaluminum dihalides such as methylaluminum dichloride, ethylaluminum dichloride, propylaluminum dichloride, n-butylaluminum dichloride, isobutylaluminum dichloride, n-hexylaluminum dichloride and the like; dialkylaluminum hydrides such as dimethylaluminum hydride, diethylaluminum hydride, di-n-propylaluminum hydride, diisopropylaluminum hydride, di-n-butylaluminum hydride, diisobutylaluminum hydride, di-n-hexylaluminum hydride and the like.

Trialkylaluminums are preferred, and trimethylaluminum, triethylaluminum, triisobutylaluminum, tri-n-butylaluminum and tri-n-hexylaluminum are more preferred. And, trimethylaluminum, triethylaluminum and triisobutylaluminum are particularly preferred.

The organometallic compound (b) is preferably the organoaluminum compound.

(c) Compound Having a Functional Group Containing Active Hydrogen or a Non-proton Donative Lewis Basic Functional Group, and an Electron Attractive Group The functional group containing active hydrogen or a non-proton donative Lewis basic functional group of the compound(c) used in the present invention normally reacts with the organometallic compound(b).

The functional group containing active hydrogen and a non-proton donative Lewis basic functional group are the same as those described above.

The compound(c) has an electron attractive group, but a substituent constant σ of Hammett's rule can be used as an index of the electron attractive group. A functional group wherein the substituent constant σ of Hammett's rule is positive corresponds to the electron attractive group.

Specific examples of the electron attractive group include a fluorine atom, chlorine atom, bromine atom, iodine atom, cyano group, nitro group, phenyl group, acetyl group, carbonyl group, thionyl group, sulfone group, carboxyl group and the like.

The compound(c) may have plural kinds and/or a plurality of functional groups containing active hydrogen or a non-proton donative Lewis basic functional groups, and electron attractive groups.

Examples of the compound(c) include amines, phosphines, alcohols, phenols, thiols, thiophenols, carboxylic acids and sulfonic acids, having an electron attractive group and the like.

The compound(c) is preferably a compound represented by the following general formula (2):

$$R^2_m ZH_{z-m} \qquad (2)$$

(wherein $R^2$ represents an electron attractive group or a group containing an electron attractive group; Z represents an atom of the 15th or 16th Group of the Periodic Table of the Elements (1993, IUPAC); H represents a hydrogen atom; and z represents a valence of Z, provided m is 1 when z is 2 and m is 1 or 2 when z is 3).

Examples of the group having an electron attractive group in $R^2$ of the general formula (2) include a halogenated alkyl group, halogenated aryl group, cyanated aryl group, nitrated aryl group, ester group and the like.

Specific examples of the halogenated alkyl group include a fluoromethyl group, chloromethyl group, bromomethyl group, iodomethyl group, difluoromethyl group, dichloromethyl group, dibromomethyl group, diiodomethyl group, trifluoromethyl group, trichloromethyl group, tribromomethyl group, triiodomethyl group, 2,2,2-trifluoroethyl group, 2,2,2-trichloroethyl group, 2,2,2-tribromoethyl group, 2,2,2-triiodoethyl group, 2,2,3,3,3-pentafluoropropyl group, 2,2,3,3,3-pentachloropropyl group, 2,2,3,3,3-pentabromopropyl group, 2,2,3,3,3-pentaiodopropyl group, 2,2,2-trifluoro-1-trifluoromethylethyl group, 2,2,2-trichloro-1-trichloromethylethyl group, 2,2,2-tribromo-1-tribromomethylethyl group, 2,2,2-triiodo-1-triiodomethylethyl group, 1,1,1,3,3,3-hexafluoro-2-trifluoromethylpropyl group, 1,1,1,3,3,3-hexachloro-2-trichloromethylpropyl group, 1,1,1,3,3,3-hexabromo-2-tribromomethylpropyl group, 1,1,1,3,3,3-hexaiodo-2-triiodomethylpropyl group and the like.

Specific examples of the halogenated aryl group include 2-fluorophenyl group, 3-fluorophenyl group, 4-fluorophenyl group, 2-chlorophenyl group, 3-chlorophenyl group, 4-chlorophenyl group, 2-bromophenyl group, 3-bromophenyl group, 4-bromophenyl group, 2-iodophenyl group, 3-iodophenyl group, 4-iodophenyl group, 2,6-difluorophenyl group, 3,5-difluorophenyl group, 2,6-dichlorophenyl group, 3,5-dichlorophenyl group, 2,6-dibromophenyl group, 3,5-dibromophenyl group, 2,6-diiodophenyl group, 3,5-diiodophenyl group, 2,4,6-trifluorophenyl group, 2,4,6-trichlorophenyl group, 2,4,6-tribromophenyl group, 2,4,6-triiodophenyl group, pentafluorophenyl group, pentachlorophenyl group, pentabromophenyl group, pentaiodophenyl group, 2-(trifluoromethyl)phenyl group, 3-(trifluoromethyl)phenyl group, 4-(trifluoromethyl)phenyl group, 2,6-di(trifluoromethyl)phenyl group, 3,5-di(trifluoromethyl)phenyl group, 2,4,6-tri(trifluoromethyl)phenyl group and the like.

Specific examples of the cyanated aryl group include 2-cyanophenyl group, 3-cyanophenyl group, 4-cyanophenyl group and the like.

Specific examples of the nitrated aryl group include 2-nitrophenyl group, 3-nitrophenyl group, 4-nitrophenyl group and the like.

Specific examples of the ester group include methoxycarbonyl group, ethoxycarbonyl group, n-propyloxycarbonyl group, isopropyloxycarbonyl group, phenoxycarbonyl group, trifluoromethyloxycarbonyl group, pentafluorophenyloxycarbonyl group and the like.

$R^2$ of the general formula (2) is preferably a halogenated alkyl or a halogenated aryl group, more preferably a fluoromethyl group, difluoromethyl group, trifluoromethyl group, 2,2,2-trifluoroethyl group, 2,2,3,3,3-pentafluoropropyl group, 2,2,2-trifluoro-1- trifluoromethylethyl group, 1,1,1,3,3,3-hexafluoro-2-trifluoromethylpropyl group, 4-fluorophenyl group, 2,6-difluorophenyl group, 3,5-difluorophenyl group, 2,4,6-trifluorophenyl group or pentafluorophenyl group, more preferably a trifluoromethyl group, 2,2,2-trifluoro-1-trifluoromethylethyl group, 1,1,1,3,3,3-hexafluoro-2-trifluoromethylpropyl group or pentafluorophenyl group.

Z in the general formula (2) represents an atom of the 15th or 16th Group of the Periodic Table of the Elements (1993, IUPAC), and H represents a hydrogen atom. Specific examples of Z include a nitrogen atom, phosphorous atom, oxygen atom, sulfur atom and the like. Among them, a nitrogen atom or an oxygen atom is preferred and oxygen atom is more preferred.

z represents a valence of Z. For example, z is 3 when Z is a nitrogen atom or phosphorous atom, whereas, z is 2 when Z is an oxygen atom or sulfur atom. m is 1 when z is 2, whereas, m is 1 or 2 when z is 3.

Specific examples of the amine compound in the compound(c) include di(fluoromethyl)amine, di(chloromethyl)amine, di(bromomethyl)amine, di(iodomethyl)amine, di(difluoromethyl)amine, di(dichloromethyl)amine, di(dibromomethyl)amine, di(diiodomethyl)amine, di(trifluoromethyl)amine, di(trichloromethyl)amine, di(tribromomethyl)amine, di(triiodomethyl)amine, di(2,2,2-trifluoroethyl)amine, di(2,2,2-trichloroethyl)amine, di(2,2,2-tribromoethyl)amine, di(2,2,2-triiodoethyl)amine, di(2,2,3,3,3-pentafluoropropyl)amine, di(2,2,3,3,3-pentachloropropyl)amine, di(2,2,3,3,3-pentabromopropyl)amine, di(2,2,3,3,3-pentaiodopropyl)amine, di(2,2,2-trifluoro-1-trifluoromethylethyl)amine, di(2,2,2-trichloro-1-trichloromethylethyl)amine, di(2,2,2-tribromo-1-tribromomethylethyl)amine, di(2,2,2-triiodo-1-triiodomethylethyl)amine, di(1,1,1,3,3,3-hexafluoro-2-trifluoromethylpropyl)amine, di(1,1,1,3,3,3-hexachloro-2-trichloromethylpropyl)amine, di(1,1,1,3,3,3-hexabromo-2-tribromomethylpropyl)amine, di(1,1,1,3,3,3-hexaiodo-2-triiodomethylpropyl)amine, di(2-fluorophenyl)amine, di(3-fluorophenyl)amine, di(4-fluorophenyl)amine, di(2-chlorophenyl)amine, di(3-chlorophenyl)amine, di(4-chlorophenyl)amine, di(2-bromophenyl)amine, di(3-bromophenyl)amine, di(4-bromophenyl)amine, di(2-iodophenyl)amine, di(3-iodophenyl)amine, di(4-iodophenyl)amine, di(2,6-difluorophenyl)amine, di(3,5-difluorophenyl)amine, di(2,6-dichlorophenyl)amine, di(3,5-dichlorophenyl)amine, di(2,6-dibromophenyl)amine, di(3,5-dibromophenyl)amine, di(2,6-diiodophenyl)amine, di(3,5-diiodophenyl)amine, di(2,4,6-trifluorophenyl)amine, di(2,4,6-trichlorophenyl)amine, di(2,4,6-tribromophenyl)amine, di(2,4,6-triiodophenyl)amine, di(pentafluorophenyl)amine, di(pentachlorophenyl)amine, di(pentabromophenyl)amine, di(pentaiodophenyl)amine, di(2-(trifluoromethyl)phenyl)amine, di(3-(trifluoromethyl)phenyl)amine, di(4-(trifluoromethyl)phenyl)amine, di(2,6-di(trifluoromethyl)phenyl)amine, di(3,5-di(trifluoromethyl)phenyl)amine, di(2,4,6-tri(trifluoromethyl)phenyl)amine, di(2-cyanophenyl)amine, di(3-cyanophenyl)amine, di(4-cyanophenyl)amine, di(2-nitrophenyl)amine, di(3-nitrophenyl)amine, di(4-nitrophenyl)amine and the like. There can also be exemplified phosphine compounds wherein the nitrogen atom is replaced with a phosphorous atom. Those phosphine compounds are compounds represented by replacing amine of the above specific examples with phosphine.

Specific examples of the alcohols described as for the compound (c) include fluoromethanol, chloromethanol, bromomethanol, iodomethanol, difluoromethanol, dichloromethanol, dibromomethanol, diiodomethanol, trifluoromethanol, trichloromethanol, tribromomethanol, triiodomethanol, 2,2,2-trifluoroethanol, 2,2,2-trichloroethanol, 2,2,2-tribromoethanol, 2,2,2-triiodoethanol, 2,2,3,3,3-pentafluoropropanol, 2,2,3,3,3-pentachloropropanol, 2,2,3,3,3-pentabromopropanol, 2,2,3,3,3-pentaiodopropanol, 2,2,2-trifluoro-1-trifluoromethylethanol, 2,2,2-trichloro-1-trichloromethylethanol, 2,2,2-tribromo-1-tribromomethylethanol, 2,2,2-triiodo-1-triiodomethylethanol, 1,1,1,3,3,3-hexafluoro-2-trifluoromethylpropanol, 1,1,1,3,3,3-hexachloro-2-trichloromethylpropanol, 1,1,1,3,3,3-hexabromo-2-tribromomethylpropanol, 1,1,1,3,3,3-hexaiodo-2-triiodomethylpropanol and the like. There can also be exemplified thiol compounds wherein the oxygen atom is replaced with a sulfur atom. Those thiol compounds are compounds represented by replacing methanol of the above specific examples with methanethiol, replacing ethanol with ethanethiol and replacing propanol with propanethiol, respectively.

Specific examples of the phenols in the compound (c) include 2-fluorophenol, 3-fluorophenol, 4-fluorophenol, 2-chlorophenol, 3-chlorophenol, 4-chlorophenol, 2-bromophenol, 3-bromophenol, 4-bromophenol, 2-iodophenol, 3-iodophenol, 4-iodophenol, 2,6-difluorophenol, 3,5-difluorophenol, 2,6-dichlorophenol, 3,5-dichlorophenol, 2,6-dibromophenol, 3,5-dibromophenol, 2,6-diiodophenol, 3,5-diiodophenol, 2,4,6-trifluorophenol, 2,4,6-trichlorophenol, 2,4,6-tribromophenol, 2,4,6-triiodophenol, pentafluorophenol, pentachlorophenol, pentabromophenol, pentaiodophenol, 2-(trifluoromethyl)phenol, 3-(trifluoromethyl)phenol, 4-(trifluoromethyl)phenol, 2,6-di(trifluoromethyl)phenol, 3,5-di(trifluoromethyl)phenol, 2,4,6-tri(trifluoromethyl)phenol, 2-cyanophenol, 3-cyanophenol, 4-cyanophenol, 2-nitrophenol, 3-nitrophenol, 4-nitrophenol and the like. There can also be exemplified thiol compounds wherein the oxygen atom is replaced with a sulfur atom. Those thiophenol compounds are compounds represented by replacing phenol of the above specific examples with thiophenol.

Specific examples of the carboxylic acids in the compound (c) include 2-fluorobenzoic acid, 3-fluorobenzoic acid, 4-fluorobenzoic acid, 2,3-difluorobenzoic acid, 2,4-difluorobenzoic acid, 2,5-difluorobenzoic acid, 2,6-difluorobenzoic acid, 2,3,4-trifluorobenzoic acid, 2,3,5-trifluorobenzoic acid, 2,3,6-trifluorobenzoic acid, 2,4,5-trifluorobenzoic acid, 2,4,6-trifluorobenzoic acid, 2,3,4,5-tetrafluorobenzoic acid, 2,3,4,6-tetrafluorobenzoic acid, pentafluorobenzoic acid, fluoroacetic acid, difluoroacetic acid, trifluoroacetic acid, pentafluoroethylcarboxylic acid, heptafluoropropylcarboxylic acid, 1,1,1,3,3,3-hexafluoro-2-propylcarboxylic acid and the like.

Specific examples of the sulfonic acids in the compound (c) include fluoromethanesulfonic acid, difluoromethanesulfonic acid, trifluoromethanesulfonic acid, pentafluoroethanesulfonic acid, heptafluoropropanesulfonic acid, 1,1,1,3,3,3-hexafluoro-2-propanesulfonic acid and the like.

Preferred examples of the amines as for the compound (c) include di(trifluoromethyl)amine, di(2,2,2-trifluoroethyl)amine, di(2,2,3,3,3-pentafluoropropyl)amine, di(2,2,2-trifluoro-1-trifluoromethylethyl)amine, di(1,1,1,3,3,3-hexafluoro-2-trifluoromethylpropyl)amine and di(pentafluorophenyl)amine; preferred examples of the alcohols include trifluoromethanol, 2,2,2-trifluoroethanol, 2,2,3,3,3-pentafluoropropanol, 2,2,2-trifluoro-1-trifluoromethylethanol and 1,1,1,3,3,3-hexafluoro-2-trifluoromethylpropanol; preferred examples of the phenols include 2-fluorophenol, 3-fluorophenol, 4-fluorophenol, 2,6-difluorophenol, 3,5-difluorophenol, 2,4,6-trifluorophenol, pentafluorophenol, 2-(trifluoromethyl)phenol, 3-(trifluoromethyl)phenol, 4-(trifluoromethyl)phenol, 2,6-di(trifluoromethyl)phenol, 3,5-di(trifluoromethyl)phenol and 2,4,6-tri(trifluoromethyl)phenol; preferred examples of the carboxylic acids include pentafluorobenzoic acid and trifluoroacetic acid; and preferred examples of the sulfonic acids include trifluoromethanesulfonic acid.

More preferred examples of the compound (c) include di(trifluoromethyl)amine, di(pentafluorophenyl)amine, trifluoromethanol, 2,2,2-trifluoro-1-trifluoroethanol, 1,1,1,3,3,3-hexafluoro-2-trifluoromethylpropanol, 4-fluorophenol, 2,6-difluorophenol, 2,4,6-trifluorophenol, pentafluorophenol, 4-(trifluoromethyl)phenol, 2,6-di(trifluoromethyl)phenol, 2,4,6-tri(trifluoromethyl)phenol, more preferably pentafluorophenol or 1,1,1,3,3,3-hexafluoro-2-trifluoromethylpropanol (popular name: perfluoro-tert-butanol).

(A) Modified Particles

The modified particles of the present invention are obtained by a process comprising contacting water-containing particles(a), an organometallic compound(b) and a compound(c) having a functional group containing active hydrogen or a non-proton donative Lewis basic functional group and an electron attractive group. Preferably, the modified particles are obtained by contacting (a) with (b) and then contacting the resultant with (c).

When (a), (b) and (c) are contacted with each other, the contact treatment is preferably carried out under an inert gas atmosphere. The treating temperature is normally within the range from −80 to 200° C., preferably from −20 to 150° C., and more preferably from 0 to 100° C. The treating time is normally from 1 minute to 48 hours, and preferably from 10 minutes to 24 hours. It is preferred to use a solvent and the solvent is preferably an aliphatic or aromatic hydrocarbon solvent, which is inert to (a), (b) and (c). Examples of the aliphatic hydrocarbon solvent include butane, pentane, hexane, heptane, octane and the like; and examples of the aromatic hydrocarbon solvent include benzene, toluene, xylene and the like. There can also be used as solvents those obtained by optionally mixing these hydrocarbon solvents.

When (a) is brought into contact with (b) and the result is brought into contact with (c), the method of bringing (a) into contact with (b) and the following method of bringing the result into contact with (c) may be the same or different.

Examples of the treating method after (a), (b) and (c) are brought into contact with each other include: a method for decantation of the supernatant of the reaction solution; method of washing a solid compound obtained after filtration with an inert solvent; method of washing a solid compound with an inert solvent and drying it under reduced pressure or an inert gas flow; method of distilling off a solvent of the reaction solution under reduced pressure or an inert gas flow; and the like. Alternatively, an operation of isolating the resulting particles may be omitted and particles obtained in the reaction solution may be used in the polymerization reaction in the state of suspension in an inert solvent.

When (a) is brought into contact with (b) and the resultant is brought into contact with (c), the treating method after the contact treatment in each stage is also the same.

Regarding the amount of (b) to (a) in the preparation of the modified particles of the present invention, the amount of the metal atom of the organometallic compound (b) contained in the particles obtained by bringing (a) into contact with (b) is preferably not less than 0.1 mmol, and more preferably 0.5 to 20 mmol, in terms of the mol number of the metal atom contained in 1 g of particles. Regarding the amount of (c), a molar ratio of the compound (c) to the organometallic compound (b) contained in 1 g of particles, i.e. (c)/(b), is preferably from 0.01 to 100, more preferably from 0.05 to 5, and most preferably from 0.1 to 2.

The modified particles of the present invention can be used as a carrier for supporting a catalyst component for olefin polymerization, such as transition metal compound, and are suitably used in the polymerization accompanying formation of polymer particles. The modified particles of the present invention can function as a catalyst component for olefin polymerization. Examples of the catalyst for olefin polymerization using the modified particles of the present include a catalyst for olefin polymerization obtained by a process comprising contacting the modified particles (A) and a transition metal compound(B), or contacting the modified particles(A), a transition metal compound(B) and an organometallic compound(C).

(B) Transition Metal Compound

The transition metal compound used in the present invention may be any transition metal compound having olefin polymerization activity, and the transition metal is preferably a transition metal of the 4th Group or lanthanide series of the Periodic Table of the Elements (1993, IUPAC). The transition metal compound is a metallocene transition metal compound having the group containing one or more cyclopentadienyl type anion skeleton, more preferably.

The metallocene transition metal compound is, for example, a compound represented by the following general formula (3):

$$ML_aR^3{}_{p-a} \qquad (3)$$

(wherein M represents a transition metal of the Group IV or lanthanide series of the Periodic Table of the Elements (1993, IUPAC); L represents a group having a cyclopentadiene type anion skeleton or a group having a heterocyclic ring, at least one of which is a group having a cyclopentadiene type anion skeleton, and a plurality of L may be the same or different and may be crosslinked to each other; $R^3$ represents a hydrocarbon group having 1 to 20 carbon atoms; "a" represents a number satisfying the expression $0 < a \leq p$; and "p" represents the valence of a transition metal atom M).

In the general formula (3) representing the metallocene transition metal compound, M is a transition metal of the Group IV or lanthanide series of the Periodic Table of the Elements (1993, IUPAC). Specific examples of the transition metal of Group IV include a titanium atom, zirconium atom, hafnium atom and the like; and examples of the transition metal atom of lanthanide series include samarium and the like. Among them, a titanium atom, zirconium atom or hafnium atom is preferred.

In the general formula (3) representing the metallocene transition metal compound, L is a group having a cyclopentadiene type anion skeleton or a group having a hetero atom, at least one of which is a group having a cyclopentadiene type anion skeleton. A plurality of L may be the same or different and may be crosslinked each other. Examples of a group having a cyclopentadiene type anion skeleton include a $\eta^5$-cyclopentadienyl group, a $\eta^5$-substituted-cyclopentadienyl or polycyclic group having a cyclopentadiene type anion skeleton. Examples of the substituent of the $\eta^5$-substituted cyclopentadienyl group include hydrocarbon groups having 1 to 20 carbon atoms, halogenated hydrocarbon groups having 1 to 20 carbon atoms or silyl groups having 1 to 20 carbon atoms. Examples of the polycyclic group having a cyclopentadiene type anion skeleton include a $\eta^5$-indenyl group, $\eta^5$-fluorenyl group and the like.

Examples of the hetero atom in the group having a hetero group include nitrogen atom, phosphorus atom, oxygen atom, sulfur atom and the like. Examples of the group having such a hetero group include a hydrocarbon amino group, hydrocarbon phosphino group, hydrocarbon oxy group, hydrocarbon thio group and the like, and preferred examples thereof include an alkoxy group, aryloxy group, alkylthio group, arylthio group, dialkylamino group, diarylamino group, dialkylphosphino group or diarylphosphino group. Specific examples of the $\eta^5$-substituted-cyclopentadienyl group include $\eta^5$-methylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-isobutylcyclopentadienyl group, $\eta^5$-sec-butylcyclopentadienyl group, $\eta^5$-tert-butylcyclopentadienyl group, $\eta^5$-1,2-dimethylcyclopentadienyl group, $\eta^5$-1,3-dimethylcyclopentadienyl group, $\eta^5$-1,2,3-trimethylcyclopentadienyl group, $\eta^5$-1,2,4-trimethylcyclopentadienyl group, $\eta^5$-teramethylcyclopentadienyl group, $\eta^5$-pentamethylcyclopentadienyl group, $\eta^5$-trimethylsilylcyclopentadienyl group and the like.

Specific examples of the polycyclic group having a cyclopentadiene type anion skeleton include $\eta^5$-indenyl group, $\eta^5$-2-methylindenyl group, $\eta^5$-4-methylindenyl group, $\eta^5$-4,5,6,7-tetrahydroindenyl group, $\eta^5$-fluorenyl group and the like.

Specific examples of the group having a hetero atom include methoxy group, ethoxy group, n- or iso-propoxy group, n-, iso-, sec- or tert-butoxy group, phenoxy group, thiomethoxy group, dimethylamino group, diethylamino group, di-n- or iso-propylamino group, di-n-, iso-, sec- or tert-butylamino group, diphenylamino group, pyrrolyl group, dimethylphosphino group and the like.

Groups having a cyclopentadiene type anion skeleton, or a group having a cyclopentadienyl group and a group having a hetero atom may be crosslinked. In that case, an alkylene group such as an ethylene group, propylene group or the like, a substituted alkylene group such as dimethylmethylene group, diphenylmethylene group or the like, or a substituted silylene group such as silylene group, dimethylsilylene group, diphenylsilylene group, tetramethyldisilylene group or the like may lie therebetween.

$R^3$ in the general formula (3) representing the metallocene transition metal compound is a halogen atom or a hydrocarbon group having 1 to 20 carbon atoms. Specific examples of $R^3$ include a halogen atom such as fluorine atom, chlorine atom, bromine atom, iodine atom; and hydrocarbon group having 1 to 20 carbon atoms, such as a methyl group, ethyl group, n-propyl group, isopropyl group, n-butyl group, phenyl group, benzyl group and the like. Preferred examples of $R^3$ include a chlorine atom, methyl group and benzyl group.

Among the metallocene transition metal compound represented by the above general formula (3), specific examples of such compounds wherein the transition metal atom M is a zirconium atom include bis(cyclopentadienyl)zirconium dichloride, bis(methylcyclopentadienyl)zirconium dichloride, bis(pentamethylcyclopentadienyl)zirconium dichloride, bis(indenyl)zirconium dichloride, bis(4,5,6,7-tetrahydroindenyl)zirconium dichloride, bis(fluorenyl)zirconium dichloride, ethylenebis(indenyl)zirconium dichloride, ethylenebis(4,5,6,7-tetrahydroindenyl)zirconium dichloride, isopropylidene(cyclopentadienyl)(fluorenyl)zirconium dichloride, dimethylsilylenebis(cyclopentadienyl)zirconium dichloride, dimethylsilylenebis(indenyl)zirconium dichloride, dimethylsilylenebis(4,5,6,7-tetrahydroindenyl)zirconium dichloride, dimethylsilylene(cyclopentadienyl)(fluorenyl) zirconium dichloride, diphenylsilylenebis(indenyl) zirconium dichloride, (cyclopentadienyl)(dimethylamide) zirconium dichloride, (cyclopentadienyl)(phenoxy) zirconium dichloride, dimethylsilyl(tert-butylamide) (tetramethylcyclopentadienyl)zirconium dichloride, bis (cyclopentadienyl)zirconium dimethyl, bis (methylcyclopentadienyl)zirconium dimethyl, bis (pentamethylcyclopentadienyl)zirconium dimethyl, bis (indenyl)zirconium dimethyl, bis(4,5,6,7-tetrahydroindenyl) zirconium dimethyl, bis(fluorenyl)zirconium dimethyl, ethylenebis(indenyl)zirconium dimethyl, dimethylsilylene (tert-butylamide)(tetramethylcyclopentadienyl)zirconium dimethyl and the like.

There can also be exemplified compounds wherein zirconium is replaced by titanium or hafnium in the above zirconium compounds.

These metallocene transition metal compounds may be used alone or in combination thereof.

(C) Organoaluminum Compound

As the organoaluminum compound (C) used in the present invention, a known organoaluminum compound can be used. Preferably, it is an organoaluminum compound represented by the general formula (4):

$$R^4{}_b AlY_{3-b} \tag{4}$$

(wherein $R^4$ represents a hydrocarbon group having 1 to 8 carbon atoms; Y represents a hydrogen atom and/or a halogen atom; and b represents a number satisfying $0 < b \leq 3$).

Specific examples of $R^4$ include a methyl group, ethyl group, n-propyl group, n-butyl group, isobutyl group, n-hexyl group, 2-methylhexyl group, n-octyl group and the like. Among them, an ethyl group, n-butyl group, isobutyl group and n-hexyl group are preferred. Specific examples of the halogen atom as for Y include a fluorine atom, chlorine atom, bromine atom, iodine atom and the like, preferably a chlorine atom.

Specific examples of the organoaluminum compound represented by the general formula (4) $R^4{}_b AlY_{3-b}$ include trialkylaluminums such as trimethylaluminum, triethylaluminum, tri-n-propylaluminum, tri-n-butylaluminum, triisobutylaluminum, tri-n-hexylaluminum, tri-n-octylaluminum and the like; dialkylaluminum chlorides such as dimethylaluminum chloride, diethylaluminum chloride, di-n-propylaluminum chloride, di-n-butylaluminum chloride, diisobutylaluminum chloride, di-n-hexylaluminum chloride and the like; alkylaluminum dichlorides such as methylaluminum dichloride, ethylaluminum dichloride, n-propylaluminum dichloride, n-butylaluminum dichloride, isobutylaluminum dichloride, n-hexylaluminum dichloride and the like; dialkylaluminum hydrides such as dimethylaluminum hydride, diethylaluminum hydride, di-n-propylaluminum hydride, di-n-butylaluminum hydride, diisobutylaluminum hydride, di-n-hexylaluminum hydride and the like. Among them, trialkylaluminums are preferred, and trimethylaluminum, triethylaluminum, tri-n-butylaluminum, triisobutylaluminum and tri-n-hexylaluminum are more preferred and triisobutylaluminum and tri-n-hexylaluminum are most preferred.

These organoaluminum compounds may be used alone or in combination thereof.

The catalyst for olefin polymerization of the present invention comprises modified particles (A), a transition metal compound (B), and optionally an organometallic compound (C). The amount of the transition metal compound (B) is normally from $1 \times 10^{-6}$ to $1 \times 10^{-3}$ mol, and preferably from $5 \times 10^{-6}$ to $5 \times 10^{-4}$ mol, based on 1 g of the modified particles (A). The amount of the organometallic compound (C) is preferably from 0.01 to 10,000, more preferably from 0.1 to 5,000, and most preferably from 1 to 2,000 in terms of molar ratio of the metal atom of the organometallic compound (c) to the transition metal atom of the transition metal compound (B), i.e.(C)/(B).

In the present invention, the modified particles (A), the transition metal compound (B) and the optional organometallic compound (C) can be charged in a reactor in an arbitrary order at the time of polymerization. Alternatively, these components, in an arbitrary combination, may be charged in the reactor after previously bringing into contact with each other.

As the monomer used in the polymerization in the present invention, olefins having 2 to 20 carbon atoms, diolefins having 4 to 20 carbon atoms, etc. can be used. Two or more olefins can also be used, simultaneously. Specific examples of the olefin include ethylene, propylene, butene-1, pentene-1, hexene-1, heptene-1, octene-1, nonene-1, decene-1, 4-methyl-1-pentene, 4-methyl-2-pentene, vinylcyclohexane and the like. Examples of the diolefin compound include conjugated dienes and non-conjugated dienes. Specific examples of the non-conjugated diene compound include 1,5-hexadiene, 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, 5-methyl-2-norbornene, norbornadiene, 5-methylene-2-norbornene, 1,5-cyclooctadiene, 5,8-endomethylenehexahydronaphthalene and the like. Specific examples of the conjugated diene include 1,3-butadiene, isoprene, 1,3-hexadiene, 1,3-octadiene, 1,3-cyclooctadiene, 1,3-cyclohexadiene and the like.

Specific examples of the monomer constituting a copolymer include combinations such as ethylene and propylene, ethylene and butene-1, ethylene and hexene-1, propylene and butene-1 and the like, but should not be limited to the above combinations.

In the present invention, an aromatic vinyl compound can also be used as a monomer. Specific examples of the aromatic vinyl compound include styrene, o-methylstyrene, m-methylstyrene, p-methylstyrene, divinylbenzene and the like.

The polymerization method is not particularly limited, and there can be used gas phase polymerization in a gaseous monomer, solution polymerization or slurry polymerization using a solvent, or the like. Examples of the solvent used in the solution polymerization or slurry polymerization include aliphatic hydrocarbon solvents such as butane, pentane, heptane, octane or the like; aromatic hydrocarbon solvents such as benzene, toluene or the like; halogenated hydrocarbon solvents such as methylene chloride or the like. It is also possible to use the olefin itself as the solvent. The polymerization may be a batch-wise polymerization or continuous polymerization and, furthermore, the polymerization may be performed in two or more stages under different reaction conditions, respectively. The polymerization time is appropriately determined depending on the kind of the desired olefin polymer and reaction apparatus, but usually within the range from 1 minute to 20 hours.

The present invention is preferably applied to the polymerization accompanying formation of polymer particles (e.g. slurry polymerization, gas phase polymerization, etc.).

The slurry polymerization can be performed according to a known slurry polymerization method and polymerization conditions, but is not limited thereto. As a preferred slurry method, there is included a continuous type reactor wherein a monomer (and, if necessary, comonomer), catalyst components and a diluent are continuously added and a polymer product is taken out, continuously or periodically. Examples of the reactor include a loop type reactor, a combination of different type reactors, or a plurality of stirring type reactors, having different reaction conditions, connected in series, parallel or a combination thereof.

As a diluent, there can be used an inert diluent (medium) such as a paraffinic, cycloparaffinic or aromatic hydrocarbon. The temperature of the polymerization reactor or reaction zone is normally within the range from about 50 to about 100° C., and preferably from about 60 to about 80° C. The pressure is normally within the range from about 0.1 to about 10 MPa, and preferably from about 0.5 to about 5 MPa. The pressure can be set to a pressure at which a catalyst can be maintained in a suspended state and a medium and at least a part of a monomer and a comonomer can be maintained in the sate of a liquid phase and, furthermore, the monomer and comonomer can be brought into contact with each other. Accordingly, the medium, temperature and pressure may be selected so that the olefin polymer is formed as solid particles and is recovered in that form.

The molecular weight of the olefin polymer can be controlled by known means such as control of the temperature of the reaction zone, introduction of hydrogen to the polymerization reactor, or the like.

The respective catalyst components and a monomer (and, if necessary, a comonomer) can be added to the reactor or reaction zone by a known method in arbitrary order. For example, there can be used a method of adding the respective catalyst components and the monomer (and, if necessary, the comonomer) to the reaction zone, simultaneously or successively. If desired, the respective catalyst components can be previously brought into contact with each other in an inert atmosphere before bringing into contact with the monomer (and if necessary, the comonomer).

The gas phase polymerization may be performed according to a known gas phase polymerization method and polymerization conditions, but is not limited thereto. As the gas phase polymerization reactor, there can be used a fluidized bed type reactor, preferably a fluidized bed type reactor having an extended portion. A reactor equipped with a stirring blade in its reactor may also be used with no problem.

In the feeding of the respective components to the polymerization vessel, there can be used a method of feeding them in the absence of water using an inert gas (e.g. nitrogen, argon, etc.), hydrogen, ethylene or the like, or a method of feeding them in the form of a solution or slurry after dilution. The respective catalyst components may be separately fed, or fed after previously bringing the arbitrary components in contact with each other in an arbitrary order.

Regarding the polymerization conditions, the temperature is lower than the temperature at which the polymer is molten, preferably from about 20 to about 100° C., and particularly preferably from 40 to 90° C. The pressure is preferably within the range of from 0.1 to 5 MPa, and more preferably from 0.3 to 4 MPa. Furthermore, hydrogen may also be added as a molecular weight modifier for the purpose of controlling the melt flow of the final product. In case of the polymerization, an inert gas may coexist in a mixed gas.

EXAMPLE

The present invention is explained in detail by the following Examples and Comparative Examples, but is not limited thereto.

Properties of olefin polymers in the Examples were measured by the following methods.

(1) Content of α-olefin in Copolymer

The content of an α-olefin in the resulting copolymer was determined from its infrared absorption spectrum. The measurement and calculation were carried out according to the method described in the literature (Characterization of Polyethylene by Infrared Absorption Spectrum, Takayama, Usami et al.; or Die MakromolekulareChemie, 177, 461 (1976) McRae, M. A., Madams, W. F.) utilizing characteristic absorption derived from butene-1, e.g. 1378 $cm^{-1}$ and 1303 $cm^{-1}$. The infrared absorption spectrum was measured by using an infrared spectrometer (FT-IR7300, manufactured by Nippon Bunko Kogyo Co., Ltd.). The short-chain branch (SCB) was represented as a short-chain branch number per 1000 carbon atoms.

(2) Melting Point of Copolymer

It was measured under the following conditions by using Seiko SSC-5200.

Heating: heating from 40 to 15020 C. (10° C./min.) and maintaining for 5 minutes.

Cooling: cooling from 150 to 40° C. (5° C./min.) and maintaining for 10 minutes.

Measurement: measured at the temperature within the range from 40 to 160° C. (5° C./min.).

(3) Intrinsic Viscosity ([η])

It was determined by measuring a drop rate of a tetralin solution prepared by dissolving 100 mg of the obtained polymer as a sample in 50 ml of tetralin at 135° C. using a Ubbelohde viscometer set in an oil bath kept at 135° C.

(4) Molecular Weight and Molecular Weight Distribution

They were determined under the following conditions by using gel permeation chromatograph (150, C, manufactured by Waters Co.).

Column: TSK gel GMH-HT

Measuring temperature: set at 145° C.

Measuring concentration: 10 mg/10 ml orthodichlorobenzene (5) Melt Flow Rate(MFR)

It was measured at 190° C. according to JIS K6760.

Example 1

(1) Contact Treatment of Particles (a) with Organometallic Compound (b)

A 100 ml four neck flask equipped with a stirrer, a dropping funnel and a thermometer was dried under reduced pressure and then replaced with nitrogen. 2.0 g of silica (manufactured by Cross Field Co., Ltd., ES70X, average diameter: 48.0 μm, pore volume: 1.61 ml/g, specific surface area: 290 $m^2/g$, TV value: 8.0% by weight) was charged in the flask. Then, 50 ml of toluene was added to form a slurry, which was cooled to 5° C. into an ice bath and 4.0 ml of a toluene solution of trimethylaluminum whose concentration was adjusted to 1 mmol/ml was slowly added dropwise. In that case, a generation of a gas was observed. After stirring at 5° C. for 30 minutes, then at 80° C. for 2 hours, the supernatant was removed by filtration and the residual solid was washed four times with 50 ml of toluene and then washed twice with 50 ml of hexane. Thereafter, the solid was dried under reduced pressure to obtain 2.0 g of a flowable solid compound.

(2) Treatment with Compound (c)

A 100 ml four neck flask equipped with a stirrer and a thermometer was dried under reduced pressure and then replaced by nitrogen. 0.53 g of the solid compound obtained in the above item (1) was charged into the flask. Then, 50 ml of toluene was added to form a slurry and 0.53 ml of a toluene solution of pentafluorophenol whose concentration was adjusted to 2 mmol/ml was slowly added. In that case, a gas was evolved. After stirring at room temperature for 30 minutes, then at 80° C. for 2 hours, the supernatant was removed by filtration and the residual solid was washed four times with 50 ml of toluene and then washed twice with 50 ml of hexane. Thereafter, the solid was dried under reduced pressure to obtain 0.39 g of flowable modified particles.

(3) Polymerization

An autoclave (internal volume of 400 ml) equipped with a stirrer, wherein the atmosphere was dried under reduced pressure and then replaced by argon, was evacuated and 95 g of butane and 5 g of butene-1 were charged in the autoclave, followed by heating to 70° C. Ethylene was added so that its partial pressure became 0.59 Mpa and, after the system became stable, 0.25 ml of a heptane solution of triisobutylaluminum whose concentration was adjusted to 1 mmol/ml was charged. Then, 0.5 ml of a toluene solution of ethylenebis(indenyl)zirconium dichloride whose concentration was adjusted to 2 μmol/ml was charged and 26.2 mg of the modified particles obtained in the above item (2) was charged as a solid catalyst component. The polymerization was performed at 70° C. for 30 minutes while feeding ethylene so that the total pressured is held constant. As a result, 26.2 g of an olefin polymer was obtained. The polymerization activity per transition metal atom was 5.2× $10^7$ g/mol-Zr/hour and polymerization activity per solid catalyst component was 2000 g/g-solid/hour. The resulting olefin polymer has SCB of 28.1, melting points of 94.2° C. and 111.7° C. and [η] of 1.47.

Comparative Example 1

(3) Polymerization

An autoclave (internal volume of 400 ml) equipped with a stirrer, wherein the atmosphere was dried under reduced pressure and then replaced by argon, was evacuated and 95 g of butane and 5 g of butene-1 were charged in the autoclave, followed by heating to 70° C. Ethylene was added so that its partial pressure became 0.59 Mpa and, after the system became stable, 0.25 ml of a heptane solution of triisobutylaluminum whose concentration was adjusted to 1 mmol/ml was charged. Then, 0.5 ml of a toluene solution of ethylenebis(indenyl)zirconium dichloride whose concentration was adjusted to 2 μmol/ml was charged and 29.2 mg of the solid obtained in the Example 1(1) above was charged as a solid catalyst component. The polymerization was performed at 70° C. for 30 minutes while feeding ethylene so that the total pressured is held constant. As a result, 0.188 g of an olefin polymer was obtained. The polymerization activity per transition metal atom was 3.8×$10^5$ g/mol-Zr/hour and polymerization activity per the solid was 13 g/g-solid/hour. The resulting olefin polymer has a melting points of 99.2° C. and [η] of 1.20.

Comparative Example 2

(1) Synthesis of Aluminum Compound

The atmosphere in a 100 ml four neck flask equipped with a stirrer, a dropping funnel and a thermometer was dried under reduced pressure and then replaced by nitrogen. 30 ml of toluene and 20.0 ml of a toluene solution of trimethylaluminum whose concentration was adjusted to 1 mmol/ml were added to the flask. After cooling to 5° C. in an ice bath, 20.0 ml of a toluene solution of pentafluorophenol whose concentration was adjusted to 2 mmol/ml was added dropwise. In that case, a gas was evolved. After stirring at 5° C. for 30 minutes, and additional at room temperature for 5 hours, and then concentration of the resulting solution, the resulting concentrate was cooled and allow to stand in a freezer to precipitate a white crystal. After the supernatant was removed by filtration, the white crystal was washed with 10 ml of hexane and then dried under reduced pressure to 2.7 g of bis(pentafluorophenoxy)methyl aluminum.

(2) Treatment of Particles with Contact Treatment Between Dried Particles and bis(pentafluorophenoxy)methyl aluminum A 100 ml four neck flask equipped with a stirrer, a dropping funnel and a thermometer was dried under reduced pressure and then replaced by nitrogen. 0.62 g of silica (manufactured by Cross Field Co., Ltd. ES70X) was charged into the flask. Then, 50 ml of toluene was added to form a slurry, and 1.3 ml of a toluene solution of bis(pentafluorophenoxy)methyl aluminum, synthesized in the above item (1), whose concentration was adjusted to 1 mmol/ml was slowly added. In that case, a gas was evolved. After stirring at room temperature for 30 minutes, then at 80° C. for 2 hours, the supernatant was removed by filtration and the residual solid was washed four times with 50 ml of toluene and then washed twice with 50 ml of hexane. Thereafter, the solid was dried under reduced pressure to obtain 0.78 g of a flowable solid compound.

(3) Polymerization

An autoclave (internal volume of 400 ml) equipped with a stirrer, wherein the atmosphere was dried under reduced pressure and then replaced by argon, was evacuated and 95 g of butane and 5 g of butene-1 were charged in the autoclave, followed by heating to 70° C. Ethylene was added so that its partial pressure became 0.59 MPa and, after the system became stable, 0.25 ml of a heptane solution of triisobutylaluminum whose concentration was adjusted to 1 mmol/ml was charged. Then, 0.5 ml of a toluene solution of ethylenebis(indenyl)zirconium dichloride whose concentration was adjusted to 2 $\mu$mol/ml was charged and 27.0 mg of the solid obtained in the above item (2) was charged as the solid catalyst component. The polymerization was performed at 70° C. for 30 minutes while feeding ethylene so that the total pressured is held constant. As a result, 20.9 g of an olefin polymer was obtained. Polymerization activity per transition metal atom was $4.2 \times 10^7$ g/mol-Zr/hour and polymerization activity per solid catalyst component was 1540 g/g/hour. The resulting olefin polymer has SCB of 30.2, a melting point of 93.4° C. and 106.7° C. and [$\eta$] of 1.57.

Example 2

(1) Contact Treatment of Particles (a) with Organometallic Compound (b)

A 100 ml four neck flask equipped with a stirrer, a dropping funnel and a thermometer was dried under reduced pressure and then replaced with nitrogen. 5.0 g of silica (manufactured by Kunimine Kogyo Ltd., Trade name: Kunipia F, TV value: 10% by weight) was charged in the flask. Then, 50 ml of toluene was added to form a slurry, which was cooled to 5° C. in an ice bath and 20.0 ml of a toluene solution of trimethylaluminum whose concentration was adjusted to 1 mmol/ml was slowly added dropwise. In that case, a gas was evolved. After stirring at 5° C. for 30 minutes, then at 80° C. for 2 hours, the supernatant was removed by filtration and the residual solid was washed four times with 50 ml of toluene and then washed twice with 50 ml of hexane. Thereafter, the solid was dried under reduced pressure to obtain 5.2 g of a flowable solid compound.

(2) Treatment with Pentafluorophenol

A 100 ml four neck flask equipped with a stirrer and a thermometer was dried under reduced pressure and then replaced by nitrogen. 2.56 g of the solid compound obtained in the above item (1) was charged into the flask. Then, 50 ml of toluene was added to form a slurry and 10.2 ml of a toluene solution of pentafluorophenol whose concentration was adjusted to 2 mmol/ml was slowly added. In that case, a gas was evolved. After stirring at room temperature for 30 minutes, then at 80° C. for 2 hours, the supernatant was removed by filtration and the residual solid was washed four times with 50 ml of toluene and then washed twice with 50 ml of hexane. Thereafter, the solid was dried under reduced pressure to obtain 2.54 g of flowable modified particles.

(3) Polymerization

An autoclave (internal volume of 400 ml) equipped with a stirrer, wherein the atmosphere was dried under reduced pressure and then replaced by argon, was evacuated and 95 g of butane and 5 g of butene-1 were charged in the autoclave, followed by heating to 70° C. Ethylene was added so that its partial pressure became 0.59 MPa and, after the system became stable, 0.25 ml of a heptane solution of triisobutylaluminum whose concentration was adjusted to 1 mmol/ml was charged. Then, 0.5 ml of a toluene solution of ethylenebis(indenyl)zirconium dichloride whose concentration was adjusted to 2 $\mu$mol/ml was charged and 42.0 mg of the modified particles obtained in the above item (2) was charged as a solid catalyst component. The polymerization was performed at 70° C. for 30 minutes while feeding ethylene so that the total pressured is held constant. As a result, 29.1 g of an olefin polymer was obtained. The polymerization activity per transition metal atom was $5.8 \times 10^7$ g/mol-Zr/hour and polymerization activity per solid catalyst component was 1390 g/g-solid/hour. The resulting olefin polymer has a SCB of 27.5, melting points of 97.7° C. and 109.6° C. and [$\eta$] of 1.37.

Comparative Example 3

(1) Polymerization

An autoclave (internal volume of 400 ml) equipped with a stirrer, wherein the atmosphere was dried under reduced pressure and then replaced by argon, was evacuated and 95 g of butane and 5 g of butene-1 were charged into the autoclave, followed by heating to 70° C. Ethylene was added so that its partial pressure became 0.59 MPa and, after the system became stable, 0.25 ml of a heptane solution of triisobutylaluminum whose concentration was adjusted to 1 mmol/ml was charged. Then, 0.5 ml of a toluene solution of ethylenebis(indenyl)zirconium dichloride whose concentration was adjusted to 2 $\mu$mol/ml was charged and 36.3 mg of the solid obtained in the Example 2(1) was charged as a solid catalyst component. The polymerization was performed at 70° C. for 30 minutes while feeding ethylene so that the total pressured is held constant. As a result, 5.67 g of an olefin polymer was obtained. The polymerization activity per transition metal atom was $1.1 \times 10^7$ g/mol-Zr/hour and polymerization activity per solid catalyst component was 310 g/g-solid/hour. The resulting olefin polymer has a SCB of 22.8, melting points of 84.1° C. and 109.2° C. and [$\eta$] of 0.72.

According to the present invention, there are provided modified particles that are capable of giving a polymer having excellent shape and particle properties with a high activity, when a catalyst for olefin polymerization that is obtained by using a transition metal compound is applied to the polymerization accompanying formation of the polymer particles (e.g. slurry polymerization, gas phase polymerization) by using the same in combination with a transition metal compound. Moreover, a carrier of said particles, a catalyst component for olefin polymerization of said particles, a catalyst for olefin polymerization obtained by using said particles, and a method of efficiently producing an olefin polymer having a high molecular weight and narrow composition distribution using said catalyst for olefin polymerization are provided.

What is claimed is:

1. Modified particles obtained by a process comprising contacting (a) porous particles having a water content of not less than 6% by weight, a diameter of 5 to 1,000 μm, a pore volume of not less than 0.3 ml/g and a specific surface area of 10 to 1000 m²/g, made of a substance selected from the group consisting of inorganic oxides, inorganic magnesium compounds, clays, clay minerals and organic polymers, (b) an organometallic compound represented by the following general formula (1):

$$R^1{}_n AX_{3-n} \quad (1)$$

wherein, A represents a boron atom or aluminum atom; $R^1$ represents a hydrocarbon group having 1 to 20 carbon atoms and when a plurality of $R^1$ are present, they may be the same or different; X represents a halogen atom or a hydrogen atom and when a plurality of X are present, they may be the same or different; and n represents a number satisfying the expression $0 < n \leq 3$, and (c) a compound having a functional group containing active hydrogen or a non-proton donative Lewis basic functional group, and an electron attractive group.

2. The modified particles according to claim 1, wherein the particles(a) are made of silica.

3. The modified particles according to claim 1, wherein A is an aluminum atom.

4. The modified particles according to claim 1, wherein the organometallic compound(b) is a trialkylaluminum.

5. The modified particles according to claim 1, wherein the functional group containing active hydrogen is a hydroxyl group, mercapto group, amino group or phosphino group.

6. The modified particles according to claim 1, wherein the electron attractive group is a halogen atom.

7. The modified particles according to claim 1, wherein the compound(c) having a functional group containing an active hydrogen or a non-proton donative Lewis basic functional group, and an electron attractive group, is a compound represented by the following general formula (2):

$$R^2{}_m ZH_{z-m} \quad (2)$$

wherein, $R^2$ represents an electron attractive group or a group containing an electron attractive group; Z represents an atom of the 15th or 16th Group of the Periodic Table of the Elements (1993, IUPAC); H represents a hydrogen atom; and z represents a valence of Z, provided m is 1 when z is 2 and m is 1 or 2 when z is 3.

8. The modified particles according to claim 7, wherein Z is a nitrogen atom, phosphorous atom, oxygen atom or sulfur atom.

9. The modified particles according to claim 7, wherein Z is a nitrogen atom or an oxygen atom.

10. The modified particles according to claim 7, wherein $R^2$ is a halogenated alkyl group, a halogenated aryl group, a cyanated aryl group, nitrated aryl group or an ester group.

11. The modified particles according to claim 7, wherein $R^2$ is a halogenated hydrocarbon group.

12. The modified particles according to claim 7, wherein $R^2$ is a fluorinated alkyl group or a fluorinated aryl group.

13. A carrier consisting essentially of modified particles obtained by a process comprising contacting (a) porous particles having a water content of not less than 6% by weight, a diameter of 5 to 1,000 μm, a pore volume of not less than 0.3 ml/q and a specific surface area of 10 to 1,000 m²/g, made of a substance selected from the group consisting of inorganic oxides, inorganic magnesium compounds, clays, clay minerals and organic polymers, (b) an organometallic compound represented by the following general formula (1):

$$R^1{}_n AX_{3-n} \quad (1)$$

wherein, A represents a boron atom or aluminum atom; $R^1$ represents a hydrocarbon group having 1 to 20 carbon atoms and when a plurality of $R^1$ are present, they may be the same or different; X represents a halogen atom or a hydrogen atom and when a plurality of X are present, they may be the same or different; and n represents a number satisfying the expression $0 < n \leq 3$, and (c) a compound having a functional group containing active hydrogen or a non-proton donative Lewis basic functional group, and an electron attractive group.

14. A catalyst component for olefin polymerization, consisting essentially of modified particles obtained by a process comprising contacting (a) porous particles having a water content of not less than 6% by weight, a diameter of 5 to 1,000 μm, a pore volume of not less than 0.3 ml/q and a specific surface area of 10 to 1,000 m²/g, made of a substance selected from the group consisting of inorganic oxides, inorganic magnesium compounds, clays, clay minerals and organic polymers, (b) an organometallic compound represented by the following general formula (1):

$$R^1{}_n AX_{3-n} \quad (1)$$

wherein, A represents a boron atom or aluminum atom; $R^1$ represents a hydrocarbon group having 1 to 20 carbon atoms and when a plurality of $R^1$ are present, they may be the same or different; X represents a halogen atom or a hydrogen atom and when a plurality of X are present, they may be the same or different; and n represents a number satisfying the expression $0 < n \leq 3$, and (c) a compound having a functional group containing active hydrogen or a non-proton donative Lewis basic functional group, and an electron attractive group.

15. A catalyst for olefin polymerization, comprising modified particles (A) obtained by a process comprising contacting (a) porous particles having a water content of not less than 6% by weight, a diameter of 5 to 1,000 μm, a pore volume of not less than 0.3 ml/q and a specific surface area of 10 to 1,000 m²/g, made of a substance selected from the group consisting of inorganic oxides, inorganic magnesium compounds, clays, clay minerals and organic polymers, (b) an organometallic compound represented by the following general formula (1):

$$R^1{}_n AX_{3-n} \quad (1)$$

wherein, A represents a boron atom or aluminum atom; $R^1$ represents a hydrocarbon group having 1 to 20 carbon atoms and when a plurality of $R^1$ are present, they may be the same or different; X represents a halogen atom or a hydrogen atom and when a plurality of X are present, they may be the same or different; and n represents a number satisfying the expression $0 < n \leq 3$, and (c) a compound having a functional group containing active hydrogen or a non-proton donative Lewis basic functional group, and an electron attractive group, a metallocene transition metal compound (B) and optionally, an organoaluminum compound (C).

16. The catalyst for olefin polymerization according to claim 15, wherein the organometallic compound(C) is an organoaluminum compound.

17. The catalyst for olefin polymerization according to claim 15, wherein the organometallic compound(C) is a compound represented by the following general formula (4):

$$R^4_b AlY_{3-b} \qquad (4)$$

(wherein $R^4$ represents a hydrocarbon group having 1 to 8 carbon atoms; Y represents a hydrogen atom and/or a halogen atom; and b represents a number satisfying the expression $0<b\leq 3$).

18. A method for producing an olefin polymer, which comprises polymerizing an olefin or copolymerizing an olefin and another olefin with a catalyst for olefin polymerization comprising modified particles (A) obtained by a process comprising contacting (a) porous particles having a water content of not less than 6% by weight, a diameter of 5 to 1,000 μm, a pore volume of not less than 0.3 ml/q and a specific surface area of 10 to 1,000 m²/g, made of a substance selected from the group consisting of inorganic oxides, inorganic magnesium compounds, clays, clay minerals and organic polymers, (b) an organometallic compound represented by the following general formula (1):

$$R^1_n AX_{3-n} \qquad (1)$$

wherein, A represents a boron atom or aluminum atom; $R^1$ represents a hydrocarbon group having 1 to 20 carbon atoms and when a plurality of $R^1$ are present, they may be the same or different; X represents a halogen atom or a hydrogen atom and when a plurality of X are present, they may be the same or different; and n represents a number satisfying the expression $0<n\leq 3$, and (c) a compound having a functional group containing active hydrogen or a non-proton donative Lewis basic functional group, and an electron attractive group, a metallocene transition metal compound (B) and optionally, an organoaluminum compound (C).

19. The method for producing an olefin polymer according to claim 18, wherein the olefin polymer is a copolymer of ethylene and α-olefin.

20. The modified particles according to claim 1, wherein the organometallic compound represented by the general formula (1):

$$R^1_n AX_{3-n} \qquad (1)$$

is at least one selected from the group consisting of trimethylaluminum, triethylaluminum, triisobutylaluminum, tri-n-butylaluminum and tri-n-hexylaluminum.

21. The carrier according to claim 13, wherein the organometallic compound represented by the general formula (1):

$$R^1_n AX_{3-n} \qquad (1)$$

is at least one selected from the group consisting of trimethylaluminum, triethylaluminum, triisobutylaluminum, tri-n-butylaluminum and tri-n-hexylaluminum.

22. The catalyst component according to claim 14, wherein the organometallic compound represented by the general formula (1):

$$R^1_n AX_{3-n} \qquad (1)$$

is at least one selected from the group consisting of trimethylaluminum, triethylaluminum, triisobutylaluminum, tri-n-butylaluminum and tri-n-hexylaluminum.

23. The catalyst for olefin polymerization according to claim 15, wherein the organometallic compound represented by the general formula (1):

$$R^1_n AX_{3-n} \qquad (1)$$

is at least one selected from the group consisting of trimethylaluminum, triethylaluminum, triisobutylaluminum, tri-n-butylaluminum and tri-n-hexylaluminum.

24. The method for producing an olefin polymer according to claim 18, wherein the organometallic compound represented by the general formula (1):

$$R^1_n AX_{3-n} \qquad (1)$$

is at least one selected from the group consisting of trimethylaluminum, triethylaluminum, triisobutylaluminum, tri-n-butylaluminum and tri-n-hexylaluminum.

* * * * *